United States Patent
Zhou

(10) Patent No.: US 11,579,038 B2
(45) Date of Patent: Feb. 14, 2023

(54) METHOD FOR CALCULATING TEMPERATURE-DEPENDENT MID-SPAN VERTICAL DISPLACEMENT OF GIRDER BRIDGE

(71) Applicant: University of Science and Technology Beijing, Beijing (CN)

(72) Inventor: Yi Zhou, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 325 days.

(21) Appl. No.: 17/098,475

(22) Filed: Nov. 16, 2020

(65) Prior Publication Data

US 2022/0050008 A1 Feb. 17, 2022

(30) Foreign Application Priority Data

Aug. 13, 2020 (CN) .......................... 202010814388.4

(51) Int. Cl.
*G01M 5/00* (2006.01)
*G06F 30/20* (2020.01)
*G06F 111/10* (2020.01)

(52) U.S. Cl.
CPC ........ *G01M 5/0008* (2013.01); *G01M 5/0041* (2013.01); *G06F 30/20* (2020.01); *G06F 2111/10* (2020.01)

(58) Field of Classification Search
CPC ..... G01M 5/008; G01M 5/0041; G06F 30/20; G06F 2111/10
See application file for complete search history.

(56) References Cited

U.S. PATENT DOCUMENTS

2015/0286751 A1 10/2015 Sayed et al.

FOREIGN PATENT DOCUMENTS

| CN | 109101745 A | 12/2018 |
| CN | 109933746 A | 6/2019 |

OTHER PUBLICATIONS

Zhou LR, Chen L, Xia Y, Koo KY. Temperature-induced structural static responses of a long-span steel box girder suspension bridge. Journal of Zhejiang University—Science A. Jul. 2020;21(7):580-92. (Year: 2020).*

(Continued)

*Primary Examiner* — Chuen-Meei Gan
(74) *Attorney, Agent, or Firm* — Bayramoglu Law Offices LLC

(57) ABSTRACT

A method for calculating a temperature-dependent mid-span vertical displacement of a girder bridge includes: setting a joint rotation of a main girder at each support as an unknown quantity, and establishing an equation according to a bending moment equilibrium condition at the joint; then introducing a sequence to establish a quantitative relationship between each unknown quantity; substituting the relationship into the equation, to obtain an analytical formula for a rotation at each joint; establishing an analytical formula for a bending moment at each joint through a principle of superposition; and finally, establishing an analytical formula for a mid-span vertical displacement of each span girder through a principle of virtual work. This method provides an analytical formula with exact solutions for prismatic girder bridges which have equal side spans yet have any number of spans.

4 Claims, 1 Drawing Sheet

(56) References Cited

OTHER PUBLICATIONS

Xia Q, Zhang J, Tian Y, Zhang Y. Experimental study of thermal effects on a long-span suspension bridge. Journal of Bridge Engineering. Jul. 1, 2017;22(7):04017034. (Year: 2017).*

Xu YL. Making good use of structural health monitoring systems of long-span cable-supported bridges. Journal of Civil Structural Health Monitoring. Jul. 2018;8(3):477-97. (Year: 2018).*

Zhou Yi, et al., Studyon Temperature Sensitivity Coefficients of Mid-Span Vertical Displacement of Cable-Stayed Bridges, Engineering Mechanics, 2020, pp. 148-154, vol. 37 No.6.

Zhou Yi, et al., Temperature Effects on The Mid-Span Vertical Displacement of A Cable-Stayed Bridge, Engineering Mechanics, 2018, pp. 46-54, vol. 35 No.8.

* cited by examiner

… … …

METHOD FOR CALCULATING TEMPERATURE-DEPENDENT MID-SPAN VERTICAL DISPLACEMENT OF GIRDER BRIDGE

CROSS REFERENCE TO THE RELATED APPLICATIONS

This application is based upon and claims priority to Chinese Patent Application No. 202010814388.4, filed on Aug. 13, 2020, the entire contents of which are incorporated herein by reference.

TECHNICAL FIELD

The disclosure relates to the technical field of structural analysis and monitoring of bridges, in particular to a method for calculating a temperature-dependent mid-span vertical displacement of a girder bridge.

BACKGROUND

Simply supported girder bridge and continuous girder bridge are the most common bridge forms in the transportation network, which are collectively referred to as "girder bridge" below. The structural deformation of the girder bridge is the focus of structural health monitoring during the operation period of the bridge. It is usually characterized by the expansion and contraction displacement at the girder ends and the mid-span vertical displacement of the main girder. There have been extensive studies on the girder-end expansion and contraction displacement of the girder bridge, which can be well estimated by the one-dimensional (1D) thermal expansion and contraction formula. However, there is much less research on temperature-induced mid-span vertical displacement of the main girder. Field monitoring shows that in sunny days, the top surface of the bridge is exposed to direct sunlight. This results in a significant vertical temperature difference between the top and the bottom surfaces of the girder, which affects the vertical deformation of the bridge and even changes the internal forces of the structure. In order to correctly understand the behavior of the girder bridge under temperature changes and provide a theoretical basis for the sensor layout in the bridge structural health monitoring system, it is necessary to study the dependency of the girder mid-span vertical displacement on the temperature difference between the top and bottom surfaces of the main girder.

At present, there are mainly two methods for calculating the thermal deformation of the girder bridge, namely theoretical analysis based on the principles of structural mechanics and numerical simulation based on the finite element (FE) calculation software. The theoretical analysis method usually calculates the thermal deformation by using the three-moment equation. It is inconvenient to solve the three-moment equation; also, the solution is of poor generality as a separate analysis is required for the structure of different span layouts. The numerical simulation method is time-consuming and laborious. It hardly reveals the mechanism behind the phenomenon, and demands necessary expertise, which restrains its on-site application by the field engineers. Regarding the mid-span vertical displacement of the girder bridge induced by the temperature difference between the top and bottom surfaces, there is no unified calculation formula with strong versatility, simple form and clear parameter relationship.

SUMMARY

The technical problem to be solved by the disclosure is to provide a method for calculating a temperature-dependent mid-span vertical displacement of a girder bridge.

This method is suitable for a straight bridge with a constant cross section, where main girders of each span are made of a same material, and a temperature difference between top and bottom surfaces of the main girders is equal everywhere along the bridge. If a total number of bridge spans is odd, the middlemost span is a main span and the rest are side spans; if the total number of bridge spans is even, the middlemost two spans are main spans and the rest are side spans. A length of the main span of the bridge may be different from that of the side spans, but the length of all side spans is the same. The calculation method includes the following steps:

(1) setting a joint rotation of a main girder at each support as an unknown quantity, and establishing an equation according to a bending moment equilibrium condition at the joint:

when the total number of the spans of the girder bridge is odd:

$$\begin{cases} 4i_0 \cdot z_k + 2i_0 \cdot z_{k+1} + M_T = 0 & \text{when } k = 1 & (1-1) \\ 2i_0 \cdot z_{k-1} + 8i_0 \cdot z_k + 2i_0 \cdot z_{k+1} = 0 & \text{when } k = 2, 3, L\ u-1 & (1-2) \\ 2i_0 \cdot z_{k-1} + (4i_0 + 2i_1) \cdot z_k = 0 & \text{when } k = u & (1-3) \end{cases}$$

when the total number of the spans of the girder bridge is even:

$$\begin{cases} 4i_0 \cdot z_k + 2i_0 \cdot z_{z+1} + M_T = 0 & \text{when } k = 1 & (2-1) \\ 2i_0 \cdot z_{k-1} + 8i_0 \cdot z_k + 2i_0 \cdot z_{k+1} = 0 & \text{when } k = 2, 3, L\ u-1 & (2-2) \\ 2i_0 \cdot z_{k-1} + (4i_0 + 4i_1) \cdot z_k = 0 & \text{when } k = u & (2-3) \end{cases}$$

where, $z_k$, $z_{k+1}$, and $z_{k-1}$ are unknowns of joint rotations, with clockwise rotation as positive; k is a subscript of the variable, k=1, 2, . . . , u; u is the number of the unknowns, u=⌈n/2⌉, which means the smallest integer not less than n/2; n is the total number of the spans of the girder bridge; because the structure and temperature change are symmetrical about the centerline of the bridge, the number of independent unknowns of joint rotations is u;

when the total number n of the spans is an odd number, a u-th span in the middlemost is designated as a main span, with a length of $l_1$, and the rest spans are side spans, with a length of $l_0$; when the total number n of the spans is an even number, a u-th span and a (u+1)-th span in the middlemost are designated as main spans, with a length of $l_1$, and the rest spans are side spans, with a length of $l_0$;

$i_0$ and $i_1$ are relative flexural stiffness of main girders of the side span and the main span respectively, defined as $i_0=(E \cdot I)/l_0$ and $i_1=(E \cdot I)/l_1$, where E is an elastic modulus of a main girder material, and I is an area moment of inertia of a main girder section;

$M_T$ is a fixed-end bending moment of a single-span girder fixed at both ends, caused by a temperature difference between top and bottom surfaces of the main girder, with the bottom of the main girder being stretched as positive, $M_T=(\alpha \cdot \Delta T \cdot E \cdot I)/h$, where $\alpha$ is a linear expansion coefficient of the main girder material; $\Delta T$ is the temperature difference between the top and bottom surfaces of the main girder, with a top surface temperature higher than a bottom surface temperature as positive; h is a section depth;

among the above equations, when u=1, only Eqs. (1-1) and (2-1) are valid, and the girder bridge has only the main span and no side spans, so it is assumed that $l_0=l_1$; when u=2, only Eqs. (1-1), (1-3), (2-1) and (2-3) are valid; when u≥3, Eqs. (1-1), (1-2), (1-3), (2-1), (2-2) and (2-3) are all valid;

(2) introducing a sequence to establish a quantitative relationship between the unknown joint rotations:

introducing a sequence $\{a_k\}$, which has a general term of:

$$a_k = \frac{\lambda \cdot \varphi_1^{k-1} + \varphi_2^{k-1}}{\lambda \cdot \varphi_1^k + \varphi_2^k}$$

where, as constants, $\varphi_1=2+\sqrt{3}$, $\varphi_2=2-\sqrt{3}$; $\lambda$ is also a constant, which is equal to $\lambda=\lambda_1=(\sqrt{3}+\xi)/(\sqrt{3}-\xi)$ for a girder bridge with an odd number of spans, and is equal to $\lambda=\lambda_2=(\sqrt{3}+2\xi)/(\sqrt{3}-2\xi)$ for a girder bridge with an even number of spans; $\xi$ is a side-to-main span ratio, that is, $\xi=l_0/l_1$; k=1, 2, ... , u−1 represents a subscript of the sequence $\{a_k\}$;

expressing the relationship between $z_k$ and $z_k$ with the help of the sequence $\{a_k\}$ as follows:

$$z_k = -a_{u-k+1} \cdot z_{k-1}$$

where, the subscript k=2, 3, ... , u;

(3) substituting the relationship between the variables in step (2) into the equation in step (1), to obtain an analytical formula for each joint rotation:

$$z_k = (-1)^k \frac{\alpha \cdot \Delta T \cdot l_0}{2\sqrt{3} \cdot h} \cdot \frac{\lambda \cdot \varphi_1^{u-k} + \varphi_2^{u-k}}{\lambda \cdot \varphi_1^{u-1} - \varphi_2^{u-1}};$$

where, k=1, 2, ... , u; for a girder bridge with an odd number of spans, $\lambda$ takes $\lambda_1$, and according to symmetry, $z_{2u+1-k}=-z_k$; for a girder bridge with an even number of spans, $\lambda$ takes $\lambda_2$, and according to symmetry, $z_{2u+2-k}=-z_k$, $z_{u+1}=0$;

(4) using a result of step (3) to obtain an analytical formula for a bending moment at each joint by a principle of superposition, where if a bending moment that makes the girder bottom stretched is assumed as a positive bending moment, when the total number of the spans of the girder bridge is an odd number, a bending moment $M_k$ at a k-th joint is:

$$M_k = \left[1 + (-1)^k \cdot \frac{\lambda_1 \cdot \varphi_1^{u-k} - \varphi_2^{u-k}}{\lambda \cdot \varphi_1^{u-1} - \varphi_2^{u-1}}\right] \cdot \frac{\alpha EI \cdot \Delta T}{h},$$

where, k=1, 2, ... , u−1;

a bending moment $M_u$ at a u-th joint is:

$$M_u = \left[1 + (-1)^u \frac{\xi}{\sqrt{3}} \cdot \frac{\lambda_1 + 1}{\lambda \cdot \varphi_1^{u-1} + \varphi_2^{u-1}}\right] \cdot \frac{\alpha EI \cdot \Delta T}{h}$$

according to symmetry, a bending moment at a (2u+1−k)-th joint is equal to the bending moment at the k-th joint, namely $M_{2u+1-k}=M_k$, where, $k=1,2,\ldots,u$;

when the total number of the spans of the girder bridge is an even number, the bending moment $M_k$ at the k-th joint is:

$$M_k = \left[1 + (-1)^k \cdot \frac{\lambda_2 \cdot \varphi_1^{u-k} - \varphi_2^{u-k}}{\lambda_2 \cdot \varphi_1^{u-1} - \varphi_2^{u-1}}\right] \cdot \frac{\alpha EI \cdot \Delta T}{h},$$

where, k=1, 2, ... , u;

a bending moment $M_{u+1}$ at a (u+1)-th joint is:

$$M_{u+1} = \left[1 + (-1)^{u+1} \frac{\xi}{\sqrt{3}} \cdot \frac{\lambda_2 + 1}{\lambda_2 \cdot \varphi_1^{u-1} - \varphi_2^{u-1}}\right] \cdot \frac{\alpha EI \cdot \Delta T}{h}$$

according to symmetry, a bending moment at a (2u+2−k)-th joint is equal to the bending moment at the k-th joint, namely $M_{2u+2-k}=M_k$, where, $k=1,2,\ldots,u$;

(5) using a result of step (4) to obtain an analytical formula for the mid-span vertical displacement of each span girder by a principle of virtual work, where if it is assumed that the mid-span downward movement of the main girder corresponds to a positive displacement, when the total number of the spans of the girder bridge is an odd number, the mid-span vertical displacement $\Delta S_k$ of the k-th span girder is:

$$\Delta_k = (-1)^k \frac{l_0^2 \cdot \alpha \cdot \Delta T}{16h} \cdot \frac{(\lambda_1 \cdot \varphi_1^{u-k-1} + \varphi_2^{u-k})(1+\sqrt{3})}{\lambda_1 \cdot \varphi_1^{u-1} - \varphi_2^{u-1}},$$

where, k=1, 2, ... , u−1;

the mid-span vertical displacement $\Delta S_u$ of the u-th span girder is:

$$\Delta_u = (-1)^u \frac{l_0^2 \cdot \alpha \cdot \Delta T}{8\sqrt{3} \cdot \xi \cdot h} \cdot \frac{\lambda_1 + 1}{\lambda_1 \cdot \varphi_1^{u-1} - \varphi_2^{u-1}}$$

according to symmetry, the mid-span vertical displacement $\Delta S_{2u-k}$ of the (2u−k)-th span girder is:

$\Delta S_{2u-k}=\Delta S_k$, where, $k=1,2,\ldots,u-1$;

when the total number of the spans of the girder bridge is an even number, the mid-span vertical displacement $\Delta S_k$ of the k-th span girder is:

$$\Delta_k = (-1)^k \frac{l_0^2 \cdot \alpha \cdot \Delta T}{16h} \cdot \frac{(\lambda_2 \cdot \varphi_1^{u-k-1} + \varphi_2^{u-k})(1+\sqrt{3})}{\lambda_2 \cdot \varphi_1^{u-1} - \varphi_2^{u-1}},$$

where, k=1, 2, ... , u−1;

the mid-span vertical displacement $\Delta S_u$ of the u-th span girder is:

$$\Delta_u = (-1)^u \frac{l_0^2 \cdot \alpha \cdot \Delta T}{16\sqrt{3} \cdot \xi \cdot h} \cdot \frac{\lambda_2 + 1}{\lambda_2 \cdot \varphi_1^{u-1} - \varphi_2^{u-1}}$$

according to symmetry, the mid-span vertical displacement $\Delta S_{2u+1-k}$ of the (2u+1−k)-th span girder is:

$\Delta S_{2u+1-k}=\Delta S_k$, where, $k=1,2,\ldots,u$.

The above girder bridge is a straight bridge, having a constant cross section and made of the same material. The temperature difference between the top and bottom surfaces of the main girders is equal everywhere along the bridge. If the total number of bridge spans is odd, the middlemost span is a main span and the rest are side spans. If the total number of bridge spans is even, the middlemost two spans are main spans and the rest are side spans. The length of all side spans of the bridge is the same.

When the length of each span of the girder bridge is identical:

the mid-span vertical displacement $\Delta S_k$ of the k-th span girder in a girder bridge with odd-numbered spans has a unified formula:

$$\Delta_k = (-1)^k \frac{l_0^2 \cdot \alpha \cdot \Delta T}{16h} \cdot \frac{(\varphi_1^{u-k} + \varphi_2^{u-k})(1+\sqrt{3})}{\varphi_1^u - \varphi_2^{u-1}},$$

where, k=1, 2, . . . , u;

according to symmetry, the mid-span vertical displacement $\Delta S_{2u-k}$ of the (2u–k)-th span girder is:

$\Delta S_{2u-k} = \Delta S_k$, where, $k=1,2,\ldots,u-1$;

the mid-span vertical displacement $\Delta S_k$ of the k-th span girder in a girder bridge with even-numbered spans has a unified formula:

$$\Delta_k = (-1)^k \frac{l_0^2 \cdot \alpha \cdot \Delta T}{16h} \cdot \frac{(\varphi_1^{u-k} - \varphi_2^{u-k+1})(1+\sqrt{3})}{\varphi_1^u + \varphi_2^u},$$

where, k=1, 2, . . . , u;

according to symmetry, the mid-span vertical displacement $\Delta S_{2u+1-k}$ of the (2u+1–k)-th span girder is:

$\Delta S_{2u-1-k} = \Delta S_k$, where, $k=1,2,\ldots,u$.

When the length of each span of the girder bridge is identical:

a change magnitude of the mid-span vertical displacement of the outermost span girder caused by the temperature difference between the top and bottom surfaces of the main girder is larger than that of the other spans; when the total number n of the spans increases, the mid-span vertical displacement of the outermost span girder approaches a limit value $\Delta S_{lim}^{max}$:

$$\Delta_{lim}^{max} = \frac{(\sqrt{3}-1)l_0^2 \cdot \alpha \cdot \Delta T}{16h};$$

the change magnitude of the mid-span vertical displacement of the middlemost span girder caused by the temperature difference between the top and bottom surfaces of the main girder is smaller than that of the other spans; when the total number n of the spans increases, the mid-span vertical displacement of the middlemost span girder approaches 0.

The above technical solution of the disclosure has the following beneficial effects.

The above solution provides a unified calculation formula for the mid-span vertical displacement of girder bridges with any number of spans induced by the temperature difference between the top and bottom surfaces of the main girder. The formula provides a simple way to calculate the exact thermal deformation, even with an electronic calculator. Also, the formula has general applicability and is convenient to perform parametric analysis. This method avoids cumbersome structural mechanics analysis, as well as finite element (FE) numerical simulation. It is very suitable for on-site calculations and verification of testing results, and thus has significant practical application value. More importantly, based on the calculation formula, this method reveals the universal law of the change of the internal force and structural deformation in the girder bridge with temperature, and gives the limit value of thermal deformation as the spans of the girder bridge increase, which has clear theoretical significance. In addition, the results obtained by this method can be used to guide the layout of measuring points in the structural health monitoring system of the girder bridge, and provide prior knowledge for the establishment of thermal deformation benchmark models.

DETAILED DESCRIPTION OF THE EMBODIMENTS

Figure 1:
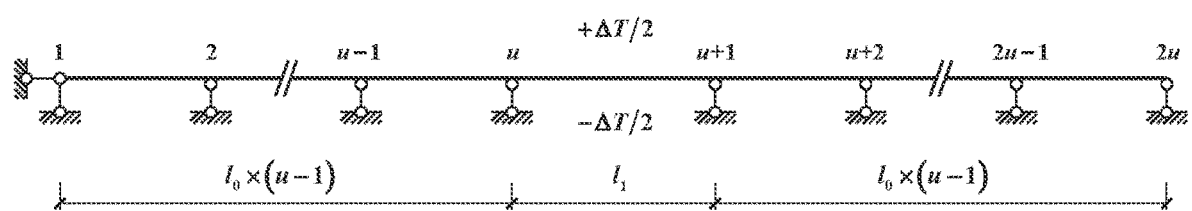
FIG. 1 is an analytical model for a girder bridge with odd-numbered spans according to an example of the disclosure.

In order to make the to-be-solved technical problems, technical solutions and advantages of the disclosure clearer, the disclosure is described in detail below with reference to the accompanying drawings and specific examples.

The disclosure provides a method for calculating a temperature-dependent mid-span vertical displacement of a girder bridge.

The method includes the following steps:

(1) Set a joint rotation of a main girder at each support as an unknown quantity, and establish an equation according to a bending moment equilibrium condition at the joint:

when the total number of the spans of the girder bridge is odd:

$$\begin{cases} 4i_0 \cdot z_k + 2i_0 \cdot z_{k+1} + M_T = 0 \text{ when } k=1 & (1-1) \\ 2i_0 \cdot z_{k-1} + 8i_0 \cdot z_k + 2i_0 \cdot z_{k+1} = 0 \text{ when } k=2,3, Lu-1 & (1-2) \\ 2i_0 \cdot z_{k-1} + (4i_0 + 2i_1) \cdot z_k = 0 \text{ when } k=u & (1-3) \end{cases}$$

when the total number of the spans of the girder bridge is even:

$$\begin{cases} 4i_0 \cdot z_k + 2i_0 \cdot z_{k+1} + M_T = 0 \text{ when } k=1 & (1-1) \\ 2i_0 \cdot z_{k-1} + 8i_0 \cdot z_k + 2i_0 \cdot z_{k+1} = 0 \text{ when } k=2,3, Lu-1 & (1-2) \\ 2i_0 \cdot z_{k-1} + (4i_0 + 4i_1) \cdot z_k = 0 \text{ when } k=u & (1-3) \end{cases}$$

where, $z_k$, $z_{k+1}$, and $z_{k-1}$ are unknowns of joint rotations, with clockwise rotation as positive; k is a subscript of the variable, k=1, 2, . . . , u; u is the number of the unknowns, u=⌈n/2⌉, which is the smallest integer not less than n/2; n is the total number of the spans of the girder bridge.

When the total number n of the spans is an odd number, a u-th span in the middlemost is designated as a main span, with a length of $l_1$, and the rest spans are side spans, with a length of $l_0$; when the total number of the spans n is an even number, a u-th span and a (u+1)-th span in the middlemost are designated as main spans, with a length of $l_1$, and the rest spans are side spans, with a length of $l_0$.

$i_0$ and $i_1$ are relative flexural stiffness of main girders of the side span and the main span respectively, defined as $i_0=(E\cdot I)/l_0$ and $i_1=(E\cdot I)/l_1$, where E is an elastic modulus of a main girder material, and I is an area moment of inertia of a main girder section.

$M_T$ is a fixed-end bending moment of a sing-span girder fixed at both ends, caused by a temperature difference between top and bottom surfaces of the main girder, with the bottom of the main girder being stretched as positive, $M_T=(\alpha\cdot\Delta T\cdot E\cdot I)/h$, where $\alpha$ is a linear expansion coefficient of the main girder material; $\Delta T$ is the temperature difference between the top and bottom surfaces of the main girder, with a top surface temperature higher than a bottom surface temperature as positive; h is a section height.

(2) Introduce a sequence to establish a quantitative relationship between the unknown joint rotations:

A sequence $\{a_k\}$ is introduced, which has a general term of:

$$a_k = \frac{\lambda\cdot\varphi_1^{k-1} + \varphi_2^{k-1}}{\lambda\cdot\varphi_1^{k} + \varphi_2^{k}}$$

where, as constants, $\varphi_1=2+\sqrt{3}$, $\varphi_2=2-\sqrt{3}$; $\lambda$ is also a constant, which is equal to $\lambda=\lambda_1=(\sqrt{3}+\xi)/(\sqrt{3}-\xi)$ for a girder bridge with an odd number of spans, and is equal to $\lambda=\lambda_2=(\sqrt{3}+2\xi)/(\sqrt{3}-2\xi)$ for a girder bridge with an even number of spans; $\xi$ is a side-to-main span ratio, that is, $\xi=l_0/l_1$; $k=1, 2, \ldots, u-1$ represents a subscript of the sequence $\{a_k\}$.

With the help of the sequence $\{a_k\}$, the relationship between $z_k$ and $z_{k-1}$ is expressed as follows:

$$z_k = a_{u-k+1}\cdot z_{k-1}$$

where, the subscript $k=2, 3, \ldots, u$.

(3) Substitute the relationship between the variables in step (2) into the equation in step (1), to obtain an analytical formula for each joint rotation:

$$z_k = (-1)^k \frac{\alpha\cdot\Delta T\cdot l_0}{2\sqrt{3}\cdot h}\cdot\frac{\lambda\cdot\varphi_1^{u-k} + \varphi_2^{u-k}}{\lambda\cdot\varphi_1^{u-1} - \varphi_2^{u-1}}$$

where, $k=1, 2, \ldots, u$; for a girder bridge with an odd number of spans, $\lambda$ takes $\lambda_1$, and according to symmetry, $z_{2u+1-k}=-z_k$; for a girder bridge with an even number of spans, $\lambda$ takes $\lambda_2$, and according to symmetry, $z_{2u+2-k}=-z_k$, $z_{u+1}=0$.

(4) Use a result of step (3) to obtain an analytical formula for the bending moment of each joint by a superposition principle.

If a bending moment that makes the girder bottom stretched is assumed as a positive bending moment, when the total number of the spans of the girder bridge is an odd number, a bending moment $M_k$ at a k-th joint is:

$$M_k = \left[1 + (-1)^k\cdot\frac{\lambda_1\cdot\varphi_1^{u-k} - \varphi_2^{u-k}}{\lambda_1\cdot\varphi_1^{u-1} - \varphi_2^{u-1}}\right]\cdot\frac{\alpha EI\cdot\Delta T}{h},$$

where, $k=1, 2, \ldots, u-1$;

a bending moment $M_u$ at a u-th joint is:

$$M_u = \left[1 + (-1)^u\frac{\xi}{\sqrt{3}}\cdot\frac{\lambda_1 + 1}{\lambda_1\cdot\varphi_1^{u-1} - \varphi_2^{u-1}}\right]\cdot\frac{\alpha EI\cdot\Delta T}{h}$$

according to symmetry, a bending moment at a (2u+1−k)-th joint is equal to the bending moment at the k-th joint, namely $$M_{2u+1-k}=M_k \text{ where, } k=1,2,\ldots,u.$$

When the total number of the spans of the girder bridge is an even number, the bending moment $M_k$ at the k-th joint is:

$$M_k = \left[1 + (-1)^k\cdot\frac{\lambda_2\cdot\varphi_1^{u-k} - \varphi_2^{u-k}}{\lambda_2\cdot\varphi_1^{u-1} - \varphi_2^{u-1}}\right]\cdot\frac{\alpha EI\cdot\Delta T}{h},$$

where, $k=1, 2, \ldots, u$;

a bending moment $M_{u+1}$ at a (u+1)-th joint is:

$$M_{u+1} = \left[1 + (-1)^{u+1}\frac{\xi}{\sqrt{3}}\cdot\frac{\lambda_2 + 1}{\lambda_2\cdot\varphi_1^{u-1} - \varphi_2^{u-1}}\right]\cdot\frac{\alpha EI\cdot\Delta T}{h}$$

according to symmetry, the bending moment at a (2u+2−k)-th joint is equal to the bending moment at the k-th joint, namely $$M_{2u+2-k}=M_k, \text{ where, } k=1,2,\ldots,u.$$

(5) Use a result of step (4) to obtain an analytical formula for the mid-span vertical displacement of each span girder by a principle of virtual work.

If it is assumed that the mid-span downward movement of the main girder corresponds to a positive displacement, when the total number of the spans of the girder bridge is an odd number, the mid-span vertical displacement $\Delta S_k$ of the k-th span girder is:

$$\Delta_k = (-1)^k\frac{l_0^2\cdot\alpha\cdot\Delta T}{16h}\cdot\frac{(\lambda_1\cdot\varphi_1^{u-k-1} + \varphi_2^{u-k})(1 + \sqrt{3})}{\lambda_1\cdot\varphi_1^{u-1} - \varphi_2^{u-1}},$$

where, $k=1, 2, \ldots, u-1$;

the mid-span vertical displacement $\Delta S_u$ of the u-th span girder is:

$$\Delta_u = (-1)^u\frac{l_0^2\cdot\alpha\cdot\Delta T}{8\sqrt{3}\cdot\xi\cdot h}\cdot\frac{\lambda_1 + 1}{\lambda_1\cdot\varphi_1^{u-1} - \varphi_2^{u-1}}$$

according to symmetry, the mid-span vertical displacement $\Delta S_{2u-k}$ of the (2u−k)-th span girder is:

$$\Delta S_{2u-k}=\Delta S_k, \text{ where, } k=1,2,\ldots,u-1.$$

When the total number of the spans of the girder bridge is an even number, the mid-span vertical displacement $\Delta S_k$ of the k-th span girder is:

$$\Delta_k = (-1)^k \frac{l_0^2 \cdot \alpha \cdot \Delta T}{16h} \cdot \frac{(\lambda_2 \cdot \varphi_1^{u-k-1} + \varphi_2^{u-k})(1+\sqrt{3})}{\lambda_2 \cdot \varphi_1^{u-1} - \varphi_2^{u-1}},$$

where, k=1, 2, ..., u−1;

the mid-span vertical displacement $\Delta S_u$ of the u-th span girder is:

$$\Delta_u = (-1)^u \frac{l_0^2 \cdot \alpha \cdot \Delta T}{16\sqrt{3} \cdot \xi \cdot h} \cdot \frac{\lambda_2 + 1}{\lambda_2 \cdot \varphi_1^{u-1} - \varphi_2^{u-1}}$$

according to symmetry, the mid-span vertical displacement $\Delta S_{2u+1+k}$ of the (2u+1−k)-th span girder is:

$$\Delta S_{2u+1-k} = \Delta S_k, \text{ where, } k=1,2,\ldots,u.$$

In a specific application, in step (1), the joint rotation of the main girder at each support is set as an unknown quantity to establish a bending moment equilibrium equation at the joint, specifically:

In an analysis model for a girder bridge with odd-numbered spans in FIG. 1, the total number of spans is n=2·u−1, where an integer u≥1, u=⌈n/2⌉ (i.e., the smallest integer not less than n/2). The u-th span is designated as the main span, with a length of $l_1$, and the rest spans are side spans, with a length of $l_0$, $i_0$ and $i_1$ are the relative flexural stiffness of the main girders of the side span and the main span respectively, $i_0=(E\cdot I)/l_0$, $i_1=(E\cdot I)/l_1$. E is an elastic modulus of a main girder material, and I is an area moment of inertia of a main girder section. h is a section depth of the main girder, $\Delta T$ is a temperature difference between the top and bottom surfaces of the main girder, and $\alpha$ is a linear expansion coefficient of the main girder material. If a side-to-main span ratio $\xi=l_0/l_1$ is introduced, $i_1=i_0\xi$.

The bending moment equilibrium equation of the main girder at each joint can be written according to the slope-deflection equation in structural mechanics. At joint 1, the bending moment equilibrium equation is as follows:

$$4i_0 \cdot z_1 + 2i_0 \cdot z_2 + M_T = 0 \tag{1}$$

In the equation, $M_T$ is a fixed-end bending moment of a single-span girder fixed at both ends, caused by the temperature difference between the top and the bottom surfaces. If the bending moment which makes the girder bottom stretched is considered positive, by referring to the ready-made tables in textbooks, the fixed-end bending moment is $$M_T = \frac{\alpha \cdot \Delta T}{h} EI \tag{2}$$

At joints k=2, 3, ..., u−1, the bending moment equilibrium equation is as follows:

$$2i_0 \cdot z_{k-1} + 8i_0 \cdot z_k + 2i_0 \cdot z_{k+1} = 0 \tag{3}$$

At joint u, the bending moment equilibrium equation is as follows:

$$2i_0 \cdot z_{u-1} + (4i_0 + 4i_1) \cdot z_u + 2i_1 \cdot z_{u+1} = 0 \tag{4}$$

Because the structure and temperature change are symmetrical about the centerline of the girder, $z_k = -z_{2u+1-k}$, where k=1, 2, ..., u, so Eq. (4) can be written as:

$$2i_0 \cdot z_{u-1} + (4i_0 + 2i_1) \cdot z_u = 0 \tag{5}$$

Meanwhile, the bending moment equilibrium equations at joints k=u+1, u+2, ..., 2u are equivalent to Eqs. (1), (3) and (5). Therefore, the number of independent unknown joint rotations is u.

Figure 2:
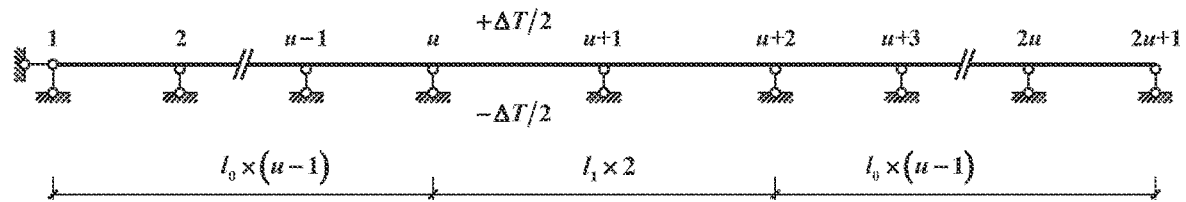
FIG. 2 is an analytical model for a girder bridge with even-numbered spans according to an example of the disclosure.

Similarly, in an analysis model for a girder bridge with even-numbered spans in FIG. 2, the total number of spans is n=2·u, where the integer u≥1. The u-th span and the (u+1)-th span in the middlemost are designated as main spans, with a length of $l_1$, and the rest spans are side spans, with a length of $l_0$. According to the slope-deflection equation in structural mechanics, the bending moment equilibrium equation of the main girder at joint 1 is the same as Eq. (1), the bending moment equilibrium equation of the main girder at joints k=2, 3, ..., u−1 is the same as Eq. (3), and the bending moment equilibrium equation of the main girder at joint u is:

$$2i_0 \cdot z_{u-1} + (4i_0 + 4i_1) \cdot z_u + 2i_1 \cdot z_{u+1} = 0 \tag{6}$$

Because the structure and temperature change are symmetrical about the centerline of the girder, $z_k = -z_{2u+2-k}$, where k=1, 2, ..., u, and $z_{n+1}=0$. Thus, Eq. (6) can be written as:

$$2i_0 \cdot z_{u-1} + (4i_0 + 4i_1) \cdot z_u = 0 \tag{7}$$

Meanwhile, the bending moment equilibrium equation at joint k=u+1 is reduced to an identity, and the bending moment equilibrium equation at joints k=u+2, u+3, ..., 2u+1 are equivalent to those written for the joints k=1, 2, ..., u. Therefore, the number of independent unknown joint rotations is still u.

Among the above derivation, when u=1, only Eq. (1) is valid, and the girder bridge has only the main span and no side spans, so it is assumed that $l_0=l_1$. When u=2, only Eqs. (1) and (5) or Eqs. (1) and (7) are valid. When u≥3, the above equations are all valid.

In step (2), a sequence is introduced to establish a quantitative relationship between the unknown joint rotations, specifically:

For the girder bridge with odd-numbered spans, it is derived from Eq. (5) that $$z_u = -\frac{2i_0}{4i_0 + 2i_1} z_{u-1} = -\frac{1}{2+\xi} z_{u-1} \tag{8}$$

By introducing $a_1=1/(2+\xi)$ and substituting $z_u=-a_1 \cdot z_{u-1}$ into Eq. (3), the relationship between $z_k$ and $z_{k-1}$ (k=u−1, u−2, ..., 2) can be rewritten as:

$$z_k = -a_{u-k+1} \cdot z_{k-1} \tag{9}$$

In the equation, the sequence $a_k$ (k=2, 3, ..., u−1) satisfies:

$$a_k = \frac{1}{4 - a_{k-1}} \tag{10}$$

Subtracting a constant $\varphi$ from both sides of Eq. (10) yields $$a_k - \varphi = \frac{1}{4 - a_{k-1}} - \varphi \tag{11}$$

Through an identical transformation, the right hand side of Eq. (11) is equivalent to $$\frac{1}{4-a_{k-1}} - \varphi = \tag{12}$$

$$\frac{1-\varphi(4-a_{k-1})}{4-a_{k-1}} = \frac{\varphi a_{k-1} + 1 - 4\varphi}{4-a_{k-1}} = \frac{\varphi(a_{k-1}-\varphi) + 1 - 4\varphi + \varphi^2}{4-a_{k-1}}$$

Let $1-4\varphi+\varphi^2=0$ in the numerator, and solutions to this quadratic equation are $\varphi_1=2+\sqrt{3}$ and $\varphi_2=2-\sqrt{3}$. According to Eq. (11), the following two equations are obtained:

$$a_k - \varphi_1 = \frac{\varphi_1(a_{k-1}-\varphi_1)}{4-a_{k-1}} \tag{13}$$

$$a_k - \varphi_2 = \frac{\varphi_2(a_{k-1}-\varphi_2)}{4-a_{k-1}} \tag{14}$$

Dividing Eq. (13) by Eq. (14) leads to:

$$\frac{a_k - \varphi_1}{a_k - \varphi_2} = \frac{\varphi_1}{\varphi_2} \cdot \frac{a_{k-1}-\varphi_1}{a_{k-1}-\varphi_2} \tag{15}$$

Therefore, the sequence $\{(a_k-\varphi_1)/(a_k-\varphi_2)\}$ is a geometric sequence with $\varphi_1/\varphi_2$ as a common ratio and $(a_1-\varphi_1)/(a_1-\varphi_2)$ as the first term, thus:

$$\frac{a_k - \varphi_1}{a_k - \varphi_2} = \left(\frac{\varphi_1}{\varphi_2}\right)^{k-1} \cdot \frac{a_1 - \varphi_1}{a_1 - \varphi_2} \tag{16}$$

As $a_1=1/(2+\xi)$, the expression of $a_k$ ($k=1, 2, \ldots, u-1$) is obtained from Eq. (16):

$$a_k = \frac{\lambda \cdot \varphi_1^{k-1} + \varphi_2^{k-1}}{\lambda \cdot \varphi_1^k + \varphi_2^k} \tag{17}$$

where the constants $\lambda=\lambda_1=(\sqrt{3}+\xi)/(\sqrt{3}-\xi)$, $\varphi_1=2+\sqrt{3}$, and $\varphi_2=2-\sqrt{3}$.

For the girder bridge with even-numbered spans, it is derived from Eq. (7) that $$z_u = -\frac{2i_0}{4i_0+4i_1} z_{u-1} = -\frac{1}{2+2\xi} z_{u-1} \tag{18}$$

By introducing $a_1=1/(2+2\xi)$ and following the same derivation process as that of the girder bridge with odd-numbered spans, Eq. (9) still applies to the relationship between $z_k$ and $z_{k-1}$. With the replacement of $\lambda=\lambda_1$ with $\lambda=\lambda_2=(\sqrt{3}+2\xi)/(\sqrt{3}-2\xi)$, the expression of $a_k$ ($k=1, 2, \ldots, u-1$), namely Eq. (17) is also valid.

In step (3), the relationship between the variables in step (2) is substituted into the equations in step (1), to obtain an analytical formula of each joint rotation. Specifically:

The general term of $a_k$ in Eq. (17) produces:

$$a_{u-1} = \frac{\lambda \cdot \varphi_1^{u-2} + \varphi_2^{u-2}}{\lambda \cdot \varphi_1^{u-1} + \varphi_2^{u-1}} \tag{19}$$

By substituting $z_2=-a_{u-1} \cdot z_1$ into Eq. (1), $z_1$ is solved as:

$$z_1 = -\frac{M_T}{2\sqrt{3} \cdot i_0} \cdot \frac{\lambda \cdot \varphi_1^{u-1} + \varphi_2^{u-1}}{\lambda \cdot \varphi_1^{u-1} - \varphi_2^{u-1}} \tag{20}$$

The rest unknowns are further solved according to Eq. (9):

$$z_k = (-1)^k \frac{M_T}{2\sqrt{3} \cdot i_0} \cdot \frac{\lambda \cdot \varphi_1^{u-k} + \varphi_2^{u-k}}{\lambda \cdot \varphi_1^{u-1} - \varphi_2^{u-1}} \tag{21}$$

Eq. (21) is applicable for $k=1, 2, \ldots, u$. For the girder bridge with odd-numbered spans, $\lambda$ takes $\lambda_1$, and according to symmetry, $z_{2u+1-k}=-z_k$. For the girder bridge with even-numbered spans, $\lambda$ takes $\lambda_2$ and according to symmetry, $z_{2u+2-k}=-z_k$ and $z_{u+1}=0$.

In step (4), a result of step (3) is used to obtain an analytical formula for the bending moment at each joint by a superposition principle. Specifically:

The bending moment that makes the girder bottom stretched is assumed as a positive bending moment. For the girder bridge with odd-numbered spans, the bending moment $M_k$ at the k-th joint ($k=1, 2, \ldots, u-1$) is $$M_k = 4i_0 \cdot z_k + 2i_0 \cdot z_{k+1} + M_T \tag{22}$$

Substituting Eqs. (2) and (21) into Eq. (22) and simplifying lead to $$M_k = \left[1 + (-1)^k \cdot \frac{\lambda_1 \cdot \varphi_1^{u-k} - \varphi_2^{u-k}}{\lambda_1 \cdot \varphi_1^{u-1} - \varphi_2^{u-1}}\right] \cdot \frac{\alpha EI \cdot \Delta T}{h} \tag{23}$$

Because of symmetry ($z_{u+1}=-z_u$), the bending moment at the u-th joint is:

$$M_u = 4i_1 \cdot z_u + 2i_1 \cdot z_{u+1} + M_T = \tag{24}$$

$$2i_1 \cdot z_u + M_T = \left[1 + (-1)^u \frac{\xi}{\sqrt{3}} \cdot \frac{\lambda_1 + 1}{\lambda_1 \cdot \varphi_1^{u-1} - \varphi_2^{u-1}}\right] \cdot \frac{\alpha EI \cdot \Delta T}{h}$$

Because of symmetry, the bending moment at the $(2u+1-k)$-th joint ($k=1, 2, \ldots, u$) is:

$$M_{2u+1-k} = M_k \tag{25}$$

For the girder bridge with even-numbered spans, the bending moment $M_k$ at the k-th joint ($k=1, 2, \ldots, u$) can be calculated by Eq. (22). However, different from the case of the odd-numbered-span bridge, the expression of $z_k$ uses $\lambda_2$ instead of $\lambda_1$. Thus, for the girder bridge with even-numbered spans, the bending moment $M_k$ at the k-th joint ($k=1, 2, \ldots, u$) is:

$$M_k = \left[1 + (-1)^k \cdot \frac{\lambda_2 \cdot \varphi_1^{u-k} - \varphi_2^{u-k}}{\lambda_2 \cdot \varphi_1^{u-1} - \varphi_2^{u-1}}\right] \cdot \frac{\alpha EI \cdot \Delta T}{h} \tag{26}$$

Because $z_{u+1}=0$, the bending moment $M_{u+1}$ at the (u+1)-th joint is:

$$M_u = -2i_1 \cdot z_u - 4i_1 \cdot z_{u+1} + M_T = \qquad (27)$$
$$-2i_1 \cdot z_u + M_T = \left[1 + (-1)^u \cdot \frac{\xi}{\sqrt{3}} \cdot \frac{\lambda_1 + 1}{\lambda_1 \cdot \varphi_1^{u-1} - \varphi_2^{u-1}}\right] \cdot \frac{\alpha EI \cdot \Delta T}{h}$$

Because of symmetry, the bending moment at the (2u+2-k)-th joint (k=1, 2, . . . , u) is:

$$M_{2u+2-k} = M_k \qquad (28)$$

In step (5), a result of step (4) is used to obtain an analytical formula for the mid-span vertical displacement of each span girder by a principle of virtual work. Specifically:

The mid-span downward movement of the main girder is assumed to be a positive displacement. When the total number of the spans of the girder bridge is an odd number, according to the principle of virtual work combined with a method of diagram multiplication, the mid-span vertical displacement of the k-th span girder (k=1, 2, . . . , u−1) is:

$$\Delta_k = \frac{1}{EI} \cdot \frac{l_0}{4} \cdot \frac{l_0}{2} \cdot \frac{M_k^L + M_k^R}{2} - \frac{\alpha \cdot \Delta T}{h} \cdot \frac{l_0}{2} \cdot \frac{l_0}{4} = \qquad (29)$$
$$(-1)^k \frac{l_0^2 \cdot \alpha \cdot \Delta T}{16h} \cdot \frac{(\lambda_1 \cdot \varphi_1^{u-k-1} + \varphi_2^{u-k})(1 + \sqrt{3})}{\lambda_1 \cdot \varphi_1^{u-1} - \varphi_2^{u-1}}$$

Similarly, the mid-span vertical displacement of the u-th span girder is:

$$\Delta_u = \frac{1}{EI} \cdot \frac{l_1}{4} \cdot \frac{l_1}{2} \cdot \frac{M_u^L + M_u^R}{2} - \frac{\alpha \cdot \Delta T}{h} \cdot \frac{l_1}{2} \cdot \frac{l_1}{4} = \qquad (30)$$
$$(-1)^u \frac{l_0^2 \cdot \alpha \cdot \Delta T}{8\sqrt{3} \cdot \xi \cdot h} \cdot \frac{\lambda_1 + 1}{\lambda_1 \cdot \varphi_1^{u-1} - \varphi_2^{u-1}}$$

According to symmetry, the mid-span vertical displacement of the (2u−k)-th span girder (k=1, 2, . . . , u−1) is:

$$\Delta S_{2u-k} = \Delta S_k \qquad (31)$$

When the total number of the spans of the girder bridge is an even number, the mid-span vertical displacement of the k-th span girder (k=1, 2, . . . , u−1) is:

$$\Delta_k = \frac{1}{EI} \cdot \frac{l_0}{4} \cdot \frac{l_0}{2} \cdot \frac{M_k^L + M_k^R}{2} - \frac{\alpha \cdot \Delta T}{h} \cdot \frac{l_0}{2} \cdot \frac{l_0}{4} = \qquad (32)$$
$$(-1)^k \frac{l_0^2 \cdot \alpha \cdot \Delta T}{16h} \cdot \frac{(\lambda_2 \cdot \varphi_1^{u-k-1} + \varphi_2^{u-k})(1 + \sqrt{3})}{\lambda_2 \cdot \varphi_1^{u-1} - \varphi_2^{u-1}}$$

Similarly, the mid-span vertical displacement of the u-th span girder is:

$$\Delta_u = \frac{1}{EI} \cdot \frac{l_1}{4} \cdot \frac{l_1}{2} \cdot \frac{M_u^L + M_u^R}{2} - \frac{\alpha \cdot \Delta T}{h} \cdot \frac{l_1}{2} \cdot \frac{l_1}{4} = \qquad (33)$$
$$(-1)^u \frac{l_0^2 \cdot \alpha \cdot \Delta T}{16\sqrt{3} \cdot \xi \cdot h} \cdot \frac{\lambda_2 + 1}{\lambda_2 \cdot \varphi_1^{u-1} - \varphi_2^{u-1}}$$

According to symmetry, the mid-span vertical displacement of the (2u+1−k)-th span girder (k=1, 2, . . . , u) is:

$$\Delta S_{2u+1-k} = \Delta S_k \qquad (34)$$

When the length of each span of the girder bridge is identical, $\xi=1$. For the girder bridge with odd-numbered spans, $\lambda_1=(\sqrt{3}+1)/(\sqrt{3}-1)$, and Eqs. (29) and (30) for calculating the mid-span vertical displacement of each span girder can be unified as:

$$\Delta_k = (-1)^k \frac{l_0^2 \cdot \alpha \cdot \Delta T}{16h} \cdot \frac{(\varphi_1^{u-k} + \varphi_2^{u-k})(1 + \sqrt{3})}{\varphi_1^u - \varphi_2^{u-1}} \qquad (35)$$

where k=1, 2, . . . , u. According to symmetry, the mid-span vertical displacement of the (2u−k)-th span girder (k=1, 2, . . . , u−1) is calculated by Eq. (31).

When the length of each span of the girder bridge is equal, for the girder bridge with even-numbered spans, $\lambda_2=(\sqrt{3}+2)/(\sqrt{3}-2)$, and Eqs. (32) and (33) for calculating the mid-span vertical displacement of each span girder can be unified as:

$$\Delta_k = (-1)^k \frac{l_0^2 \cdot \alpha \cdot \Delta T}{16h} \cdot \frac{(\varphi_1^{u-k} + \varphi_2^{u-k+1})(1 + \sqrt{3})}{\varphi_1^u - \varphi_2^u} \qquad (35)$$

where k=1, 2, . . . , u. According to symmetry, the mid-span vertical displacement of the 2u+1−k-th span girder (k=1, 2, . . . , u) is calculated by Eq. (34).

According to Eq. (35), for the odd-numbered-span girder bridge with a given u, the mid-span vertical displacement magnitude $|\Delta S_k|$ of each span girder is proportional to $\varphi_1^{u-k} + \varphi_2^{u-k}$. As $\varphi_2=1/\varphi_1$, two functions $f_1(x)=x+1/x$ and $g_1(x)=\varphi_1^{u-x}$ are introduced to define a composite function, which leads to $f_1(g_1(k))=\varphi_1^{u-k}+\varphi_2^{u-k}$. For k=1, 2, . . . , u, $g_1(k)$ decreases with the increase of k and $g_1(k) \geq 1$. On the other hand, the derivative $f'_1(x)=1-1/x^2$ implies that $f_1(x)$ is a monotonically increasing function in the region of $x \geq 1$. Therefore, $f_1(g_1(k))$ decreases monotonically with the increase of k, that is, the outermost span girder (k=1) has the largest magnitude of the mid-span vertical displacement while the middlemost span girder (k=u) has the smallest magnitude.

Similarly, for the even-numbered-span girder bridge with a given u, according to Eq. (36), the mid-span vertical displacement magnitude $|\Delta S_k|$ of each span girder is proportional to $\varphi_1^{u-k} - \varphi_2^{u-k+1}$. A new function $f_2(x)=x-\varphi_2/x$ is introduced and composed with $g_1(x)=\varphi_1^{u-x}$, which leads to $f_2(g_1(k))=\varphi_1^{u-k}-\varphi_2^{u-k+1}$. For k=1, 2, . . . , u, $g_1(k)$ decreases with the increase of k and $g_1(k) \geq 1$. Meanwhile, the derivative $f'_2(x)=1+\varphi_2/x^2>0$, so $f_2(g_1(k))$ decreases monotonically with the increase of k. Therefore, for the girder bridge with even-numbered spans, the mid-span vertical displacement magnitude of the outermost span girder (k=1) is the largest, while those of the middlemost span girders (k=u and k=u+1) are the smallest.

In summary, for the girder bridges with either odd- or even-numbered spans, the outermost and the middlemost span girders respectively have the largest and smallest magnitudes of the mid-span vertical displacement induced by the temperature difference between the top and bottom surfaces of the girder.

For the main girder in the span of k=1, when u approaches infinity, Eqs. (35) and (36) both converge to a constant $\Delta S_{lim}^{max}$:

$$\Delta_{lim}^{max} = -\frac{(\sqrt{3}-1)l_0^2 \cdot \alpha \cdot \Delta T}{16h} \qquad (37)$$

Therefore, the mid-span vertical displacement of the outermost span girder in a girder bridge has a limit value as the number of bridge spans increases, namely $\Delta S_{lim}^{max}$.

Similarly, for the main girder in the span of k=u, when u approaches infinity, Eqs. (35) and (36) both converge to 0. Therefore, the mid-span vertical displacement of the middlemost span girder in a girder bridge also has a limit value as the number of bridge spans increases, namely 0.

The disclosure is described in detail below with reference to the specific examples.

Example 1

A 6-span continuous girder bridge has equal spans of 110 m. The prismatic girder is made of steel, and has a depth of 4.5 m. The temperature difference between the top and bottom surfaces of the main girder due to direct sunlight is 20° C. The mid-span vertical displacement of the 1$^{st}$ and 3$^{rd}$ spans needs to be determined.

As the number of spans is n=6, the abovementioned girder bridge has an even number of spans, and the number of independent unknown joint rotations is u=3. The main and side spans have identical length of $l_0=l_1=110$ m; the linear expansion coefficient of the main girder is $\alpha=1.2\times10^{-5}$ °C.$^{-1}$; the girder depth is h=4.5 m; and the temperature difference between the top and bottom surfaces of the main girder is $\Delta T=20°$ C. Substituting the above parameters into Eq. (36) leads to $\Delta S_1=-0.0295$ m for k=1, and $\Delta S_3=-0.0016$ m for k=3. It can be seen that the mid-span vertical displacement magnitude of the 1st span girder is greater than that of the 3$^{rd}$ span girder, and the negative sign before the displacement value means that the mid-span deck moves upward.

Example 2

A girder bridge has n spans, each span being 110 m in length. The prismatic girder is made of steel, and has a depth of 4.5 m. The temperature difference between the top and bottom surfaces of the main girder is 20° C. For n=1, 2, ..., 10, the mid-span vertical displacement of the outermost span girder needs to be calculated.

It can be seen from the above that $l_0=l_1=110$ m, $\alpha=1.2\times10^{-5}$ C.$^{-1}$, h=4.5 m, $\Delta T=20°$ C., and k=1. According to the parity of the span number n, these parameters are substituted into Eqs. (35) or (36) with u=⌈n/2⌉ (i.e., the smallest integer not less than n/2). As a result, the mid-span vertical displacement of the outermost span girder corresponding to different total span numbers is obtained, that is, −0.0807 m, −0.0202 m, −0.0323 m, −0.0288 m, −0.0297 m, −0.0295 m, −0.0295 m, −0.0295 m, −0.0295 m, and −0.0295 m, which are listed in the order of increasing n. From n=6, the mid-span vertical displacement of the outermost span girder is close to −0.0295 m, which is the limit value calculated by Eq. (37). This example clearly indicates that when the continuous girder bridge has a large number of spans, the girder mid-span vertical displacement caused by the temperature difference between the top and the bottom surfaces of the main girder is small, and is thus difficult to be accurately measured by the commonly used equipment.

The above described are preferred implementations of the disclosure. It should be noted that a person of ordinary skill in the art may further make several improvements and modifications without departing from the principle of the disclosure, but such improvements and modifications should also be deemed as falling within the protection scope of the disclosure.

What is claimed is:

1. A method for calculating a temperature-dependent mid-span vertical displacement of a girder bridge, comprising the following steps:

(1) setting a joint rotation of a main girder at each support as an unknown quantity, and establishing an equation according to a bending moment equilibrium condition at a joint:

when a total number of a plurality of spans of the girder bridge is an odd number:

$$\begin{cases} 4i_0 \cdot z_k + 2i_0 \cdot z_{k+1} + M_T = 0 & \text{when } k = 1 \quad (A1) \\ 2i_0 \cdot z_{k-1} + 8i_0 \cdot z_k + 2i_0 \cdot z_{k+1} = 0 & \text{when } k = 2, 3, L\ u-1; \quad (A2) \\ 2i_0 \cdot z_{k-1} + (4i_0 + 2i_1) \cdot z_k = 0 & \text{when } k = u \quad (A3) \end{cases}$$

when the total number of the plurality of spans of the girder bridge is an even number:

$$\begin{cases} 4i_0 \cdot z_k + 2i_0 \cdot z_{k+1} + M_T = 0 & \text{when } k = 1 \quad (B1) \\ 2i_0 \cdot z_{k-1} + 8i_0 \cdot z_k + 2i_0 \cdot z_{k+1} = 0 & \text{when } k = 2, 3, L\ u-1; \quad (B2) \\ 2i_0 \cdot z_{k-1} + (4i_0 + 4i_1) \cdot z_k = 0 & \text{when } k = u \quad (B3) \end{cases}$$

wherein, $z_k$, $z_{k+1}$, and $z_{k-1}$ are unknowns of the joint rotation, a clockwise rotation is set as a positive rotation; k is a subscript of each of the unknowns, k=1, 2, ..., u; u is a number of the unknowns, u=⌈n/2⌉, u is a smallest integer not less than n/2; wherein n is the total number of the plurality of spans of the girder bridge;

when the total number n of the plurality of spans is the odd number, a u-th span in a middlemost position is designated as a main span and has a length of $l_1$, and the plurality of spans excluding the u-th span are side spans, wherein each of the side spans has a length of $l_0$;

when the total number n of the plurality of spans is the even number, the u-th span and a (u+1)-th span in the middlemost position are designated as the main span and each has the length of $l_1$, and the plurality of spans excluding the u-th span and the (u+1)-th span are the side spans, wherein each of the side spans has the length of $l_0$;

$i_0$ and $i_1$ are a relative flexural stiffness of the main girder of the side spans and a relative flexural stiffness of the main girder of the main span, respectively, $i_0=(E\cdot I)/l_0$ and $i_1=(E\cdot I)/l_1$, wherein E is an elastic modulus of a material of the main girder, and I is an area moment of inertia of a section of the main girder;

$M_T$ is a fixed-end bending moment of a single-span girder fixed at both ends, wherein the fixed-end bending moment is caused by a temperature difference between a top surface and a bottom surface of the main girder, a bending moment making a bottom of the main girder being stretched is assumed as a positive bending moment, $M_T=(\alpha \cdot \Delta T \cdot E \cdot I)/h$, wherein $\alpha$ is a linear expansion coefficient of the material of the main girder; $\Delta T$ is the temperature difference between the top surface and the bottom surface of the main girder, a temperature of the top surface higher than a temperature of the bottom surface is set as positive; h is a depth of the section;

(2) introducing a sequence to establish a quantitative relationship between the unknowns of the joint rotation:

wherein the sequence $\{a_k\}$ has a general term of:

$$a_k = \frac{\lambda \cdot \varphi_1^{k-1} + \varphi_2^{k-1}}{\lambda \cdot \varphi_1^k + \varphi_2^k};$$

wherein, $\varphi_1 = 2+\sqrt{3}$, $\varphi_2 = 2-\sqrt{3}$ are constants; $\lambda$ is also a constant;

when the total number of the plurality of spans of the girder bridge is the odd number, $\lambda = \lambda_1 = (\sqrt{3}+\xi)/(\sqrt{3}-\xi)$;

when the total number of the plurality of spans of the girder bridge is the even number, $\lambda = \lambda_2 = (\sqrt{3}+2\xi)/(\sqrt{3}-2\xi)$; wherein $\xi$ is a side-to-main span ratio, and $\xi = l_0/l_1$; $k=1, 2, \ldots, u-1$ represents a subscript of the sequence $\{a_k\}$;

by using the sequence $\{a_k\}$, defining a relationship between $z_k$ and $z_{k-1}$ as:

$$z_k = -a_{u-k+1} z_{k-1};$$

wherein, the subscript $k=2, 3, \ldots, u$;

(3) substituting the relationship in step (2) into the equation in step (1), to obtain an analytical formula for the joint rotation:

$$z_k = (-1)^k \frac{\alpha \cdot \Delta T \cdot l_0}{2\sqrt{3} \cdot h} \cdot \frac{\lambda \cdot \varphi_1^{u-k} + \varphi_2^{u-k}}{\lambda \cdot \varphi_1^{u-1} - \varphi_2^{u-1}};$$

wherein, $k=1, 2, \ldots, u$;

for the girder bridge with the odd number of the plurality of spans, $\lambda$ takes $\lambda_1$, and according to a symmetry, $z_{2u+1-k} = -z_k$; and for the girder bridge with the even number of the plurality of spans, $\lambda$ takes $\lambda_2$; and according to the symmetry, $z_{2u+2-k} = -z_k$, $z_{u+1} = 0$;

(4) using a result obtained from step (3) to obtain an analytical formula for a bending moment at each joint by a principle of superposition, wherein if the bending moment making the bottom of the main girder stretched is assumed as the positive bending moment, when the total number of the plurality of spans of the girder bridge is the odd number, a bending moment $M_k$ at a k-th joint is:

$$M_k = \left[1 + (-1)^k \cdot \frac{\lambda_1 \cdot \varphi_1^{u-k} - \varphi_2^{u-k}}{\lambda_1 \cdot \varphi_1^{u-1} - \varphi_2^{u-1}}\right] \cdot \frac{\alpha EI \cdot \Delta T}{h},$$

wherein, $k=1, 2, \ldots, u-1$;

a bending moment $M_u$ at a u-th joint is:

$$M_u = \left[1 + (-1)^u \frac{\xi}{\sqrt{3}} \cdot \frac{\lambda_1 + 1}{\lambda_1 \cdot \varphi_1^{u-1} - \varphi_2^{u-1}}\right] \cdot \frac{\alpha EI \cdot \Delta T}{h};$$

according to the symmetry, a bending moment at a (2u+1−k)-th joint is equal to the bending moment $M_k$ at the k-th joint, namely $$M_{2u+1-k} = M_k, \text{ wherein, } k=1,2,\ldots,u;$$

when the total number of the plurality of spans of the girder bridge is the even number, the bending moment $M_k$ at the k-th joint is:

$$M_k = \left[1 + (-1)^k \cdot \frac{\lambda_2 \cdot \varphi_1^{u-k} - \varphi_2^{u-k}}{\lambda_2 \cdot \varphi_1^{u-1} - \varphi_2^{u-1}}\right] \cdot \frac{\alpha EI \cdot \Delta T}{h},$$

wherein, $k=1, 2, \ldots, u$;

a bending moment $M_{u+1}$ at a (u+1)-th joint is:

$$M_{u+1} = \left[1 + (-1)^{u+1} \frac{\xi}{\sqrt{3}} \cdot \frac{\lambda_2 + 1}{\lambda_2 \cdot \varphi_1^{u-1} - \varphi_2^{u-1}}\right] \cdot \frac{\alpha EI \cdot \Delta T}{h};$$

according to the symmetry, a bending moment at a (2u+2−k)-th joint is equal to the bending moment $M_k$ at the k-th joint, namely $$M_{2u+2-k} = M_k, \text{ wherein, } k=1,2,\ldots,u; \text{ and}$$

(5) using a result obtained from step (4) to obtain an analytical formula for the temperature-dependent mid-span vertical displacement of the main girder of each of the main span and the side spans by a principle of virtual work and to guide layout of measuring points in a structural health monitoring system of the girder bridge, wherein if it is assumed that a mid-span downward movement of the main girder corresponds to a positive displacement, when the total number of the plurality of spans of the girder bridge is the odd number, a temperature-dependent mid-span vertical displacement $\Delta S_k$ of the main girder of a k-th span is:

$$\Delta_k = (-1)^k \frac{l_0^2 \cdot \alpha \cdot \Delta T}{16h} \cdot \frac{(\lambda_1 \cdot \varphi_1^{u-k-1} + \varphi_2^{u-k})(1+\sqrt{3})}{\lambda_1 \cdot \varphi_1^{u-1} - \varphi_2^{u-1}},$$

wherein, $k=1, 2, \ldots, u-1$;

a temperature-dependent mid-span vertical displacement $\Delta S_u$ of the main girder of the u-th span is:

$$\Delta_u = (-1)^k \frac{l_0^2 \cdot \alpha \cdot \Delta T}{8\sqrt{3} \cdot \xi \cdot h} \cdot \frac{\lambda_1 + 1}{\lambda_1 \cdot \varphi_1^{u-1} - \varphi_2^{u-1}};$$

according to the symmetry, a temperature-dependent mid-span vertical displacement $\Delta S_{2u-k}$ of the main girder of a (2u−k)-th span is:

$$\Delta S_{2u-k} = \Delta S_k, \text{ wherein, } k=1,2,\ldots,u-1;$$

when the total number of the plurality of spans of the girder bridge is the even number, the temperature-dependent mid-span vertical displacement $\Delta S_k$ of the main girder of the k-th span is:

$$\Delta_k = (-1)^k \frac{l_0^2 \cdot \alpha \cdot \Delta T}{16h} \cdot \frac{(\lambda_2 \cdot \varphi_1^{u-k-1} + \varphi_2^{u-k})(1+\sqrt{3})}{\lambda_2 \cdot \varphi_1^{u-1} - \varphi_2^{u-1}},$$

wherein, k=1, 2, . . . , u−1;

the temperature-dependent mid-span vertical displacement $\Delta S_u$ of the main girder of the u-th span is:

$$\Delta_u = (-1)^u \frac{l_0^2 \cdot \alpha \cdot \Delta T}{16\sqrt{3} \cdot \xi \cdot h} \cdot \frac{\lambda_2 + 1}{\lambda_1 \cdot \varphi_1^{u-1} - \varphi_2^{u-1}};$$

according to the symmetry, a temperature-dependent mid-span vertical displacement $\Delta S_{2u+1-k}$ of the main girder of a (2u+1−k)-th span is:

$\Delta S_{2u+1-k} = \Delta S_k$, wherein, k=1,2, . . . ,u.

2. The method according to claim 1, wherein the girder bridge is a straight bridge, and the girder bridge has a constant cross section and made of an identical material;

the temperature difference between the top surface and the bottom surface of the main girder is equal everywhere along the girder bridge;

if the total number of the plurality of spans is the odd number, a middlemost span is the main span and the plurality of spans excluding the middlemost span are the side spans;

if the total number of the plurality of spans is the even number, two middlemost spans are the main span and the plurality of spans excluding the two middlemost spans are the side spans; and the side spans of the girder bridge each have an identical length.

3. The method according to claim 1, wherein when the plurality of spans of the girder bridge each have an identical length, the temperature-dependent mid-span vertical displacement $\Delta S_k$ of the main girder of the k-th span in the girder bridge with odd-numbered spans has a unified formula:

$$\Delta_k = (-1)^k \frac{l_0^2 \cdot \alpha \cdot \Delta T}{16h} \cdot \frac{(\varphi_1^{u-k} + \varphi_2^{u-k})(1+\sqrt{3})}{\varphi_1^u - \varphi_2^{u-1}},$$

wherein, k=1, 2, . . . , u;

according to the symmetry, the temperature-dependent mid-span vertical displacement $\Delta S_{2u-k}$ of the main girder of the (2u−k)-th span is:

$\Delta S_{2u-k} = \Delta S_k$, wherein, k=1,2, . . . ,u−1;

the temperature-dependent mid-span vertical displacement $\Delta S_k$ of the main girder of the k-th span in the girder bridge with even-numbered spans has a unified formula:

$$\Delta_k = (-1)^k \frac{l_0^2 \cdot \alpha \cdot \Delta T}{16h} \cdot \frac{(\varphi_1^{u-k} - \varphi_2^{u-k+1})(1+\sqrt{3})}{\varphi_1^u - \varphi_2^u},$$

wherein, k=1, 2, . . . , u;

according to the symmetry, the temperature-dependent mid-span vertical displacement $\Delta S_{2u+1-k}$ of the main girder of the (2u+1−k)-th span is:

$\Delta S_{2u+1-k} = \Delta S_k$, wherein, k=1,2, . . . ,u.

4. The method according to claim 1, wherein when the plurality of spans of the girder bridge each have an identical length:

the temperature-dependent mid-span vertical displacement of the main girder of an outermost side span has a largest change magnitude caused by the temperature difference between the top surface and the bottom surface of the main girder;

when the total number n of the plurality of spans increases, the temperature-dependent mid-span vertical displacement of the main girder of the outermost side span approaches a limit value $\Delta S_{lim}^{max}$:

$$\Delta_{lim}^{max} = -\frac{(\sqrt{3}-1)l_0^2 \cdot \alpha \cdot \Delta T}{16h};$$

the temperature-dependent mid-span vertical displacement of the main girder of a middlemost span has a smallest change magnitude caused by the temperature difference between the top surface and the bottom surface of the main girder; and when the total number n of the plurality of spans increases, the temperature-dependent mid-span vertical displacement of the main girder of the middlemost span approaches 0.

* * * * *